United States Patent [19]
Yamada

[11] Patent Number: 5,249,854
[45] Date of Patent: Oct. 5, 1993

[54] BRAKING CIRCUIT PROVIDED WITH ANTILOCKING APPARATUS

[75] Inventor: Shinji Yamada, Itami, Japan

[73] Assignee: Sumitomo Electric Industries, Ltd., Osaka, Japan

[21] Appl. No.: 997,154

[22] Filed: Dec. 15, 1992

Related U.S. Application Data

[63] Continuation of Ser. No. 686,477, Apr. 17, 1991, abandoned.

[30] Foreign Application Priority Data

Apr. 25, 1990 [JP] Japan .................. 2-111075

[51] Int. Cl.⁵ .................. B60T 13/14
[52] U.S. Cl. .................. 303/115.4; 303/116.1; 303/87
[58] Field of Search .................. 303/10, 11, 87, 113.1, 303/115.1, 115.4, 116.1, 117.1, 116.2

[56] References Cited

U.S. PATENT DOCUMENTS

| | | | |
|---|---|---|---|
| 4,685,749 | 8/1987 | Otsuki et al. | 303/115 PP |
| 4,812,777 | 3/1989 | Shirai | 303/87 X |
| 4,941,712 | 7/1990 | Hirobe | 303/115 PP |
| 4,964,680 | 10/1990 | Nokubo et al. | 303/115 PP |
| 5,031,969 | 7/1991 | Siegel | 303/87 X |

FOREIGN PATENT DOCUMENTS

| | | |
|---|---|---|
| 202845 | 11/1986 | European Pat. Off. . |
| 283332 | 9/1988 | European Pat. Off. . |
| 361502 | 4/1990 | European Pat. Off. . |
| 2643860 | 9/1976 | Fed. Rep. of Germany . |
| 2703761 | 8/1978 | Fed. Rep. of Germany . |
| 3844126 | 7/1989 | Fed. Rep. of Germany . |
| 1-43663 | 9/1989 | Japan . |
| 60866 | 3/1990 | Japan .................. 303/117 |
| 95956 | 4/1990 | Japan .................. 303/87 |
| 114048 | 4/1990 | Japan .................. 303/117 |

*Primary Examiner*—Robert J. Oberleitner
*Assistant Examiner*—Alfred Muratori
*Attorney, Agent, or Firm*—Cushman, Darby & Cushman

[57] ABSTRACT

A braking circuit provided with an antilocking apparatus, which prevents the pumping pulsation from transferring onto the master cylinder side during pumping operation time in a reflux system of antilocking apparatus of discharging the operating liquid into the reflux passage from the wheel brake at the antilocking time so as to reflux it onto the master cylinder side by a pump provided on the reflux passage, thereby to effectively restrain the undesired pulsation to be transferred onto the master cylinder side by the equalization of the discharge pressure through the absorption of the discharge pressure.

7 Claims, 4 Drawing Sheets

BRAKING CIRCUIT PROVIDED WITH ANTILOCKING APPARATUS

This is a continuation of application Ser. No. 07/686,477, filed on Apr. 17 1991, now abandoned.

BACKGROUND OF THE INVENTION

The present invention generally relates to a braking circuit provided with an antilocking apparatus, and more particularly, prevents the pumping pulsation from transferring onto the master cylinder portion of a reflux system at the pumping operation time of the antilocking apparatus by discharging the operating liquid into the reflux passage from the wheel brake at the antilocking time to reflux it onto the master cylinder side by a pump provided in the reflux passage.

Conventionally, this type of reflux system of antilocking apparatus adopts a system of having a) a reflux passage which is branched from a main flow passage for connecting a master cylinder with a wheel brake so as to return the operating liquid to a return point on the main flow passage on the upper stream side (namely, the master cylinder side) above the branch point, b) a pump which is provided on the reflux passage to flow back the operating liquid, c) a pressure governing means which is adapted to reduce the braking pressure of the wheel brake by the discharging of the operating liquid from the branch point into the reflux passage or to feed the operating liquid into the wheel brake by way of the branch point from the main flow passage of the downstream under the reflux point so as to increase the braking pressure of the wheel brake.

In the apparatus adopting the reflux system, a normally opened liquid pressure feeding valve by the electromagnetic operation on the main flow passage between the reflux point and the branch point is provided as, for example, the pressure governing means, and also, a normally closed liquid pressure discharging valve by the electromagnetic operation is provided on the reflux passage between the branch point and the pump so as to effect the brake liquid pressure control at the antilocking time through three modes of pressure reduction, retention, pressure increase by the switching operation of the two electromagnetic valves.

In the antilocking apparatus of the reflux system, the operating liquid to be discharged from the wheel brake is returned onto the master cylinder side by the pump at the antilocking pressure reduction time, so that the problems of noise and so on due to the vibrations of the brake pedal and the vibrations of the piping system by the pumping pulsation are caused.

In order to reduce the transferring of the pulsation of the pumping onto the master cylinder side, various methods are proposed. There are proposed, for example, a method (West Germany Patent Application No. 2643860) of providing a throttle between the pumping discharge opening and the return point, having a buffer chamber having the large area between the throttle and the pump discharge opening, and a method (Japanese Patent Publication Tokukohei No. 1-43663) of providing a check valve, between the return point and the master cylinder, with the side towards the return point from the master cylinder being in a forward direction, and also, a member slidably engaged with the check valve and a piston fixed to the member are provided, the volume of an accumulator portion for accommodating the operating liquid from the pump is increased by the movement of the slidable member, further the piston lowers the pumping discharge pressure so as not to transfer it onto the master cylinder side.

But there are various problems in the transfer preventing method of the pump pulsation conventionally proposed. Namely, the method of West Germany patent, there are problems that the load of the pumping becomes larger due to increase in the pump discharge pressure on the side of the throttle as the whole amount of the pump discharge amount passes through the throttle, and the size becomes larger due to the provision of the buffer chamber of the large diameter so as to require the end plug and so on. Also, the method of Japanese Patent Publication Tokukohei 1-43663 has problems in that the large accumulator portion is required, and as the size becomes larger, the cost become higher and so on, because the construction is extremely complicated, and all the pump discharge liquid is stored in amount in the normal antilocking condition so as not to return onto the master cylinder side under the normal antilocking condition.

SUMMARY OF THE INVENTION

Accordingly, the present invention has been developed to substantially eliminate the drawbacks inherent in the prior art and has for its essential object to provide an improved braking circuit.

Another important object of the present invention is to provide an improved braking circuit of the type referred to above, wherein an apparatus is provided which is adapted to effectively restrict the undesired pulsation from being transferred onto the master cylinder side by equalizing the discharge pressure through the absorption of the discharge pressure which becomes periodically larger considering especially the characteristics of the pulsation of the pump, and also, the apparatus is adapted to be prevented from becoming larger in size and from becoming higher in cost as the extremely simple construction of the apparatus.

In accomplishing these and other objects, according to one preferred embodiment of the present invention, there is provided a braking circuit provided with an antilocking apparatus which comprises a reflux passage that is separated from the main flow passage connecting the master cylinder with the wheel brake so as to reflux the operating liquid to the main flow passage from a first return point of the upper stream side (namely, master cylinder side) above the branch point, a pump for refluxing the operating liquid provided on the reflux passage, a pressure governing means that is adapted to reduce the braking pressure of the wheel brake by the discharging of the operating liquid from the wheel brake to the reflux passage, and also, to increase the braking pressure of the wheel brake by the feeding of the operating liquid into the wheel brake from the main flow passage, and which is characterized in that there are further provided with a liquid chamber interposed between the pump and the feedback point in the reflux passage and having a first port to be connected onto the feedback point side, a second port to be connected onto the discharge side of the pump, a valve member which is slidably accommodated within the above described liquid chamber so as to cut off the first port and the second port normally with the spring force, and also, to make the first port communicate with the second port by the movement through the discharge liquid pressure of the pump to be flowed into the liquid chamber, a valve member accommodating chamber which has one portion of the valve member accommodated at the movement time of the valve member so as to increase the operation liquid accommodating volume of the liquid chamber in accordance with the movement amount of the valve member, a liquid pressure absorbing means which is adapted to absorb the pump discharge liquid pressure by the increase in the operating liquid accommodating volume of the liquid chamber when the pump discharge liquid pressure is large.

More particularly, the characteristics of the present invention are in that the valve member accommodating chamber is connected with one end of the liquid chamber, a valve opening, closing portion for opening, closing the valve seat formed in the first port is formed at one end in the valve member to be accommodated within the liquid chamber, and also, an accommodating portion to be slidably inserted into the valve member accommodating chamber is formed on the other end side. When the valve seat is opened by the pump discharge liquid pressure to move the valve member, the valve member accommodating portion is inserted into the valve member accommodating chamber so as to increase the operation liquid accommodating volume within the liquid chamber.

The valve member is moved against the spring force in accordance with the pressure force of the pump discharge liquid to be inflowed from the second portion at the pressure reduction of the antilocking so as to increase the operating liquid accommodating volume within the liquid chamber. The large discharge pressure is absorbed so as to equalize the discharge pressure to be refluxed onto the feedback point side from the second port, so that the unpleasant pump pulsation to be transferred to the brake pedal through the master cylinder may be restrained.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
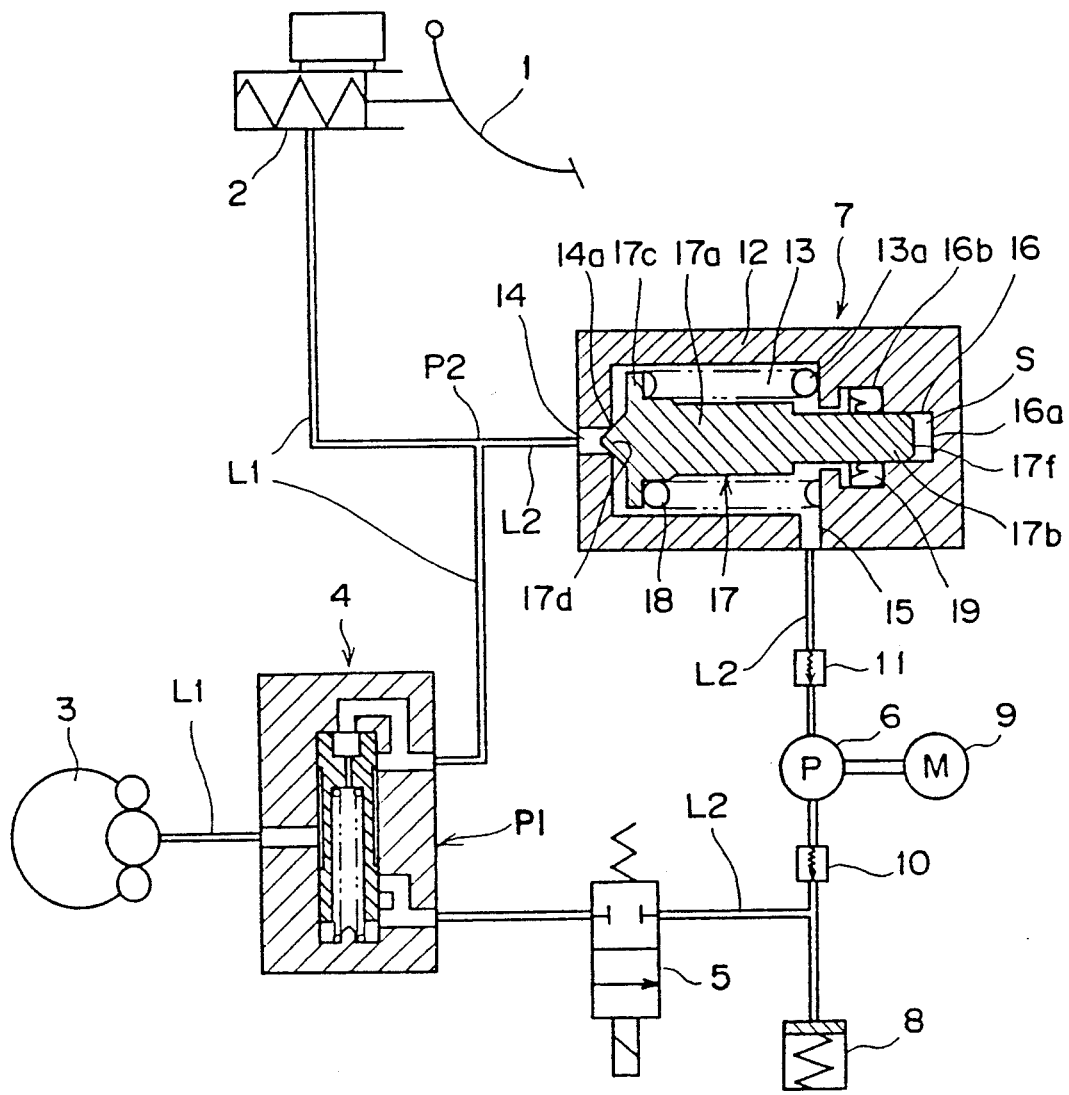
FIG. 1 is a whole construction view showing an embodiment of a braking circuit provided with an antilocking apparatus in accordance with the present invention.

Before the description of the present invention proceeds, it is to be noted that like parts are designated by like reference numerals throughout the accompanying drawings.

EMBODIMENT

Referring now to the drawings, there is shown in FIG. 1, a braking circuit provided with an antilocking apparatus according to one preferred embodiment of the present invention, which includes a brake pedal 1, a master cylinder 2 for operating in accordance with a pedaling force of the brake pedal 1, a wheel brake 3, a main flow passage L1 for connecting the master cylinder 2 with the wheel brake 3, a reflux passage L2 which is branched at the branch point P1 from the main flow passage L1 so as to join the main flow passage L1 at the return point P2 of the upstream side (namely, the master cylinder 2 side) above the branch point P1, a flow amount controlling valve 4 provided at a branch point P1 of the main flow passage L1, an electromagnetic valve 5 provided on the reflux passage L2, a pump for the operating liquid reflux use 6 provided with the electromagnetic valve 5 and the return point P2 in the reflux passage L2, a pressure absorbing valve 7 provided on the reflux passage L2 between the pump 6 and the return point P2.

The electromagnetic valve 5, which is normally closed, to be provided on the reflux passage L2 is adapted to automatically open by the electromagnetic operation at the antilocking pressure reduction time, to discharge the operating liquid from the wheel brake 3 into the reflux passage L2 through flow amount controlling valve 4 so as to pressure reduce the wheel brake 3. At the pressure reincreasing time of the braking pressure, the electromagnetic valve 5 is closed to cut off the discharge into the reflux passage L2, and also, the operating liquid is fed into the wheel brake 3 through the flow amount control valve 4 from the main flow passage L1 so as to increase pressure to the wheel brake 3, with the pressure governing means of the operating liquid being composed of the flow amount controlling valve 4 and the electromagnetic valve 5.

On the reflux passage L2, a reservoir 8 is provided on the lower stream of the electromagnetic valve 5, the pump 6 to be driven by the motor 9 is provided on the lower stream of the reservoir 8. The check valves 10, 11 are respectively coupled to the pump 6 and the reservoir 8, and the pump 6 and the pressure absorbing valve 7, so that the operating liquid discharged into the reflux passage L2 is refluxed only in the direction of the return point P2 from the branch point P1.

The pressure absorbing valve 7 has a liquid chamber 13 provided within the housing 12, a first port 14 connecting onto the side of the return point P2 of the reflux passage L2 is communicated with the left end (in the drawing) of the liquid chamber 13, and a second port 15 connecting with the reflux passage L2 on the pump discharging side is formed on the lower portion on the right end right side opposite to the liquid chamber 13. Within the housing 12, a valve member accommodating chamber 16 of the small diameter is formed in communication with the center portion of the right end face of the liquid chamber 13.

A valve member 17 is accommodated from the above described liquid chamber 13 to the valve member accommodating chamber 16, and is approximately cylindrical shape having two stages of large, small diameters. The larger diameter portion 17a is accommodated in the large space drilled in the interior portion of the liquid chamber 13, while the tip end side of the accommodating portion 17b composed of the smaller diameter portion is slidably inserted into the valve member accommodating chamber 16. A flange portion 17c is projected from the tip end outer periphery of the larger diameter portion 17a of the valve member 17 with a valve opening/closing portion 17d projected into a conical shape is formed in the central portion of the flange portion 17c. A spring 18 is contracted between the above described flange portion 17c and the other end face 13a (the side face on the communication side with respect to the valve member accommodating chamber 16 so as to urge the valve opening/closing portion 17d to come into contact against the valve seat portion 14a of the first port 14 for normally closing the first port 14 to cut off the flow passage with respect to the second port 15. A space S is set to be caused between the tip end 17f of the valve member accommodating portion 17b inserted into the valve member accommodating chamber 16 and the tip end wall face 16a of the valve member accommodating chamber 16 with the valve member 17 being urged by the spring 18. It is to be noted that the tip end of the valve member accommodating chamber 16 may be kept open. A seal mounting portion 16b is formed in the axial intermediate portion of the valve member accommodating chamber 16, and the operating liquid is adapted not to be leaked onto the space S side of the valve member accommodating chamber 16 into the liquid chamber 13 with a seal 19 being provided between the inner peripheral face of the seal mounting portion 16b and the outer peripheral face of the valve member small diameter portion 17b.

Figure 2:
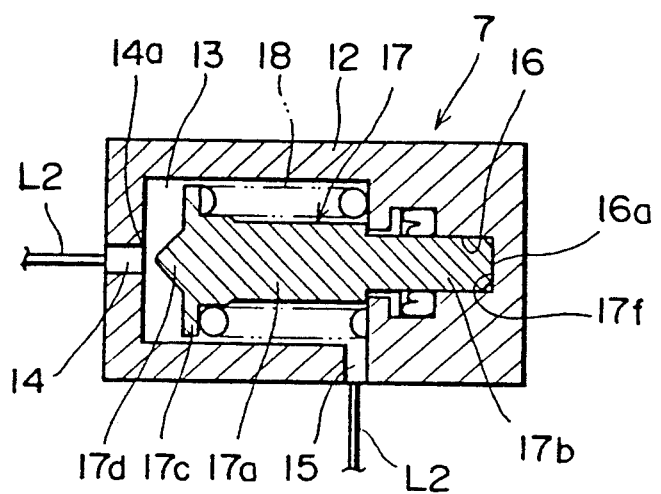
FIG. 2 is a sectional view showing the operation of a pressure absorbing valve.

When the pump discharge liquid is flowed into the second port 15 in the pressure absorbing valve 7, it enters into the liquid chamber 13 to act upon the flange portion 17c of the valve member 17 for moving the valve member 17 against the spring 18 in the right direction in the drawing so as to open the valve seat 14a of the first port 14. The valve member accommodating portion 17b is inserted further deeply into the interior of the valve member accommodating chamber 16, as shown in FIG. 2, by the movement of the valve member 17, because the space S is provided within the valve member accommodating chamber 16. Therefore, the volume of the valve member 17 located within the liquid chamber 13 is decreased, and the filling volume of the operating liquid within the liquid chamber 13 is to be correspondingly increased.

Figure 3:
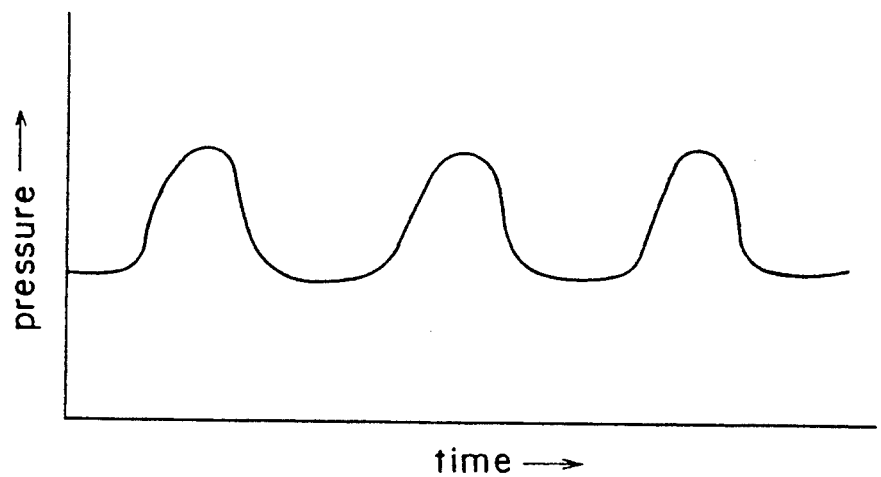
FIG. 3 is a chart showing the pump discharge pressure.

The operating liquid to be discharged out of the pump 6 becomes periodically larger in pressure as shown in FIG. 3, the valve member 17 of the above described pressure absorbing valve 7 is moved in accordance with the pressure to increase the filling volume of the operating liquid, so that the pressure is to be absorbed when the larger pressure has been applied. Thus, the operating liquid having the pressure fluctuation shown in FIG. 3 is not discharged from the second port 15 in a condition as it is, and the large pressure is moderated, namely, the pulsating is moderated, so that the pressure becomes approximately uniform and is discharged out of the second port 15.

Figure 4A:
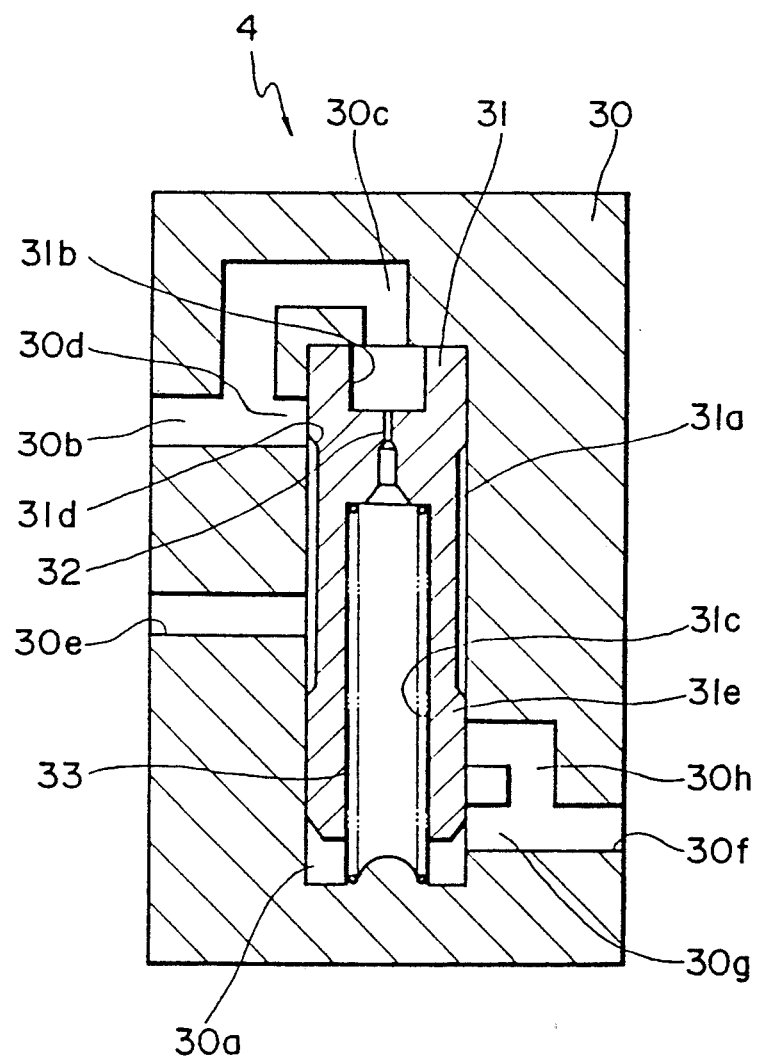
FIG. 4 (A) through FIG. 4 (C) are sectional views showing the operation of the flow amount controlling valve.
Figure 4B:
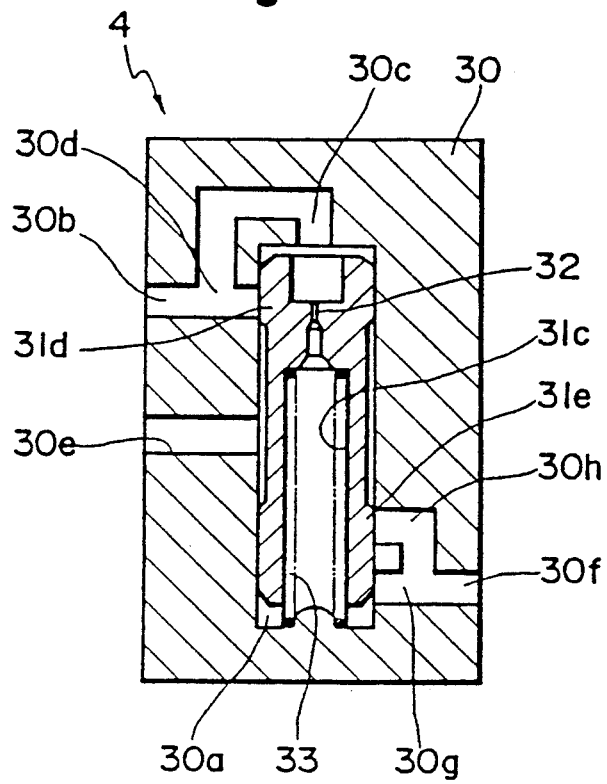
Figure 4C:
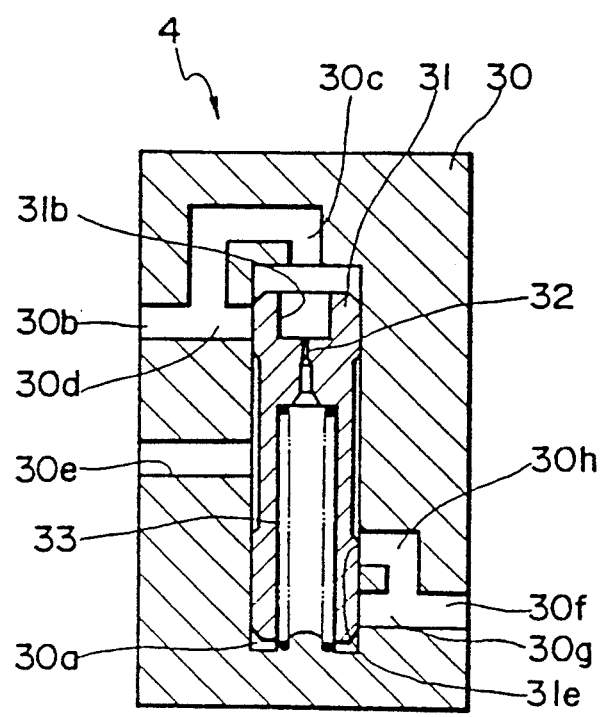

The flow amount controlling valve 4 composing the above described adjusting means engages a spool 31 slidably in the axial direction into the hole 30a drilled in the housing 30 as shown in detail in FIG. 4 (A). A entrance 30b connected with the first port 14 of the above described flow passage area switching valve 7 through the main flow passage L1 on the return point P2 side, flow passages 30c, 30d branched from the entrance 30b and communicating with the hole 30a, a first exit 30e connected with the main flow passage L1 on the side of the wheel brake 3, a second exit 30f connected with the reflux passage L2, flow passages 30g, 30h branched from the second exit 30f and connected with the hole 30a are provided on the side face of the housing 30.

The spool 31 has an outer peripheral groove portion 31a provided on the side face, and also, has holes respectively opened in both the end faces through the orifice 32 along the axial core portion so as to constitute a pressure adding chamber 31b, a pressure reducing chamber 31c. A spring 33 is contracted in, inserted into the pressure reducing chamber 31c to upwardly (in the drawing) urge the spool 31.

As the flow amount controlling valve 4 is constructed as described hereinabove, the spool 33 is provided in a position shown in FIG. 4 (A) at the normal brake pressure increasing time. A large flow passage for flowing the operating liquid from the master cylinder 2 side onto the side of the wheel brake 3 through the entrance 30b, the outer peripheral groove portion 31a, the first exit 30e is formed.

The operation of the embodiment of the invention will be described hereinafter.

At the normal braking operation time, namely, at the non-antilocking time, the operating liquid is guided into the flow amount controlling valve 4 from the master cylinder 2 side, and is introduced into the wheel brake 3 through the large flow passage with the flow amount controlling valve 4. Therefore, the operating liquid corresponding to the pedaling force of the brake pedal 1 is fed to the wheel brake 3 so as to apply the pressure upon the brake.

At the antilocking pressure reducing time, the electromagnetic valve 5 is opened, the operating liquid within the pressure reducing chamber 31c of the flow amount controlling valve 4 is discharged onto the side of the reflux passage L2 from the second exit 30f through the flow passage 30g and flows into the reservoir 8 through the electromagnetic valve 5. In the flow amount controlling valve 4, the different pressure is caused at both the ends of the spool 31 with the orifice 32 as a boundary by the outflowing of the operating liquid from the pressure reducing chamber 31c, and the spool 31 is moved downwards in the drawing as shown in FIG. 4 (B). Therefore, the communication between the outer peripheral groove portion 31a and the entrance 30b is cut off by the edge 31d of the outer peripheral groove portion 31a so as to close the large flow passage. As shown in FIG. 4 (C), the spool 31 moves downwards in the drawing so as to form a pressure reducing passage leading to the first exit 30e→the outer peripheral groove portion 31a→the flow passage 30h→the second exit 30f. In the pressure reducing flow passage, the flow amount is controlled in accordance with the open condition of the flow passage 30h by the edge 31e so as to discharge the operating liquid from the wheel brake 3 into the reflux passage L2. The operating liquid discharged into the reflux passage L2 is stored in the reservoir 8, and is discharged onto the side of the pressure absorbing valve 7 through the pump 6 to be driven by the motor 9. As described hereinabove, in the pressure absorbing valve 7, the operating liquid flowed into the liquid chamber 13 from the second port 15 moves so that the accommodating portion 17b may insert the valve member 17 deep into the valve member accommodating chamber 16 in accordance with the pressure so as to increase the operating liquid filling capacity of the liquid chamber 13 in accordance with the movement amount, so that the pressure fluctuation is absorbed to reflux it to the return point P2 from the first port 14 with approximately equal pressure. It is refluxed onto the master cylinder 2 side with the pulsation being restrained through the main flow passage L1 from the return point P2.

At the pressure reincreasing time after the antilocking operation, the electromagnetic valve 5 become non-fed so as to stop the outflow of the operating liquid from the second exit 30f of the flow amount controlling valve 4. As shown in FIG. 4 (C), under the condition, the small flow passage leading to the entrance 30b→the flow passage 30c→the pressure increasing chamber 31b→the orifice 32→the pressure reducing chamber 31c→the flow passage 30g→the flow passage 30h→the outer peripheral groove 31a→the first exit 30e in the flow amount controlling valve 4. The operating fluid from the master cylinder 2 is fed to the wheel brake 3 through the small flow passage of the flow amount controlling valve 4 through the main flow passage L1 so as to slowly raise the pressure of the brake 3. When the different pressure between the above described flow entrance 30b and the first exit 30e becomes smaller, the spool 31 of the above described flow amount controlling valve 4 is restored into a position shown in FIG. 4 (A) by the urging force of the spring 33 to retain the large flow passage again.

At the pressure reincreasing time, one portion of the operating liquid to be discharged from the pump 6 is fed to the wheel brake 3 through the flow amount controlling valve 4 from the return point P2.

As is clear from the foregoing description, in the braking circuit provided with an antilocking apparatus in accordance with the present invention, the operating liquid to be discharged from the pump at the antilocking operation is absorbed large in volume so as to ease the pressure variation, so that it is refluxed onto the master cylinder side so as to restrain the pulsation to be operated upon the brake pedal. Also, as the present utility model is of simple construction only with provision of the pressure absorbing valve composed of extremely simple construction, the pulsation of the pump discharging pressure is restrained to improve the pedal feeling without the space being made larger, the size being made larger, and the cost being made higher.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. An anti-lock braking apparatus for use in a vehicle, comprising:
    means for braking said vehicle;
    a master cylinder for providing an operating liquid at a braking pressure to said braking means;
    main flow passage means for coupling said master cylinder to said braking means to direct said operating liquid to said braking means, said main flow passage means comprising a first portion coupled to said master cylinder and a second portion coupled to said braking means;
    means, coupled to said braking means and said master cylinder between said first and second portions of said main flow passage means, for regulating said braking pressure of said operating liquid being provided to said braking means;
    reflux passage means, for directing said operating liquid from said regulating means to said first portion of said main flow passage means, said reflux passage means comprising a first section coupled to said first portion of said main flow passage means and a second section coupled to said regulating means, said second section comprising means for pumping said operating liquid through said reflux passage means to reflux said operating liquid;
    pressure absorbing means, coupled to said pressure regulating means and said main flow passage means between said first and second sections of said reflux passage means, for absorbing a reflux pressure of said operating liquid being refluxed through said reflux passage means, said pressure absorbing means comprising:
        a first chamber having a liquid receiving portion for receiving said operating liquid being refluxed, said liquid receiving portion having a variable volume, a first opening for communicating with said first section of said reflux passage means and a second opening for communicating with said second section of said reflux passage means, said first and second openings communicating with each other through said first chamber;
        first valve member means, slidably disposed inside said first chamber, having a first end for optionally covering said first opening to prevent said first chamber from communicating with said first section of said reflux passage and to prevent said first opening from communicating with said second opening and a second end opposing said first end, said first and second ends having first and second cross sections, respectively, said first cross section being smaller than said second cross section;
        means for applying a predetermined force to said second end of said first valve member means to cause said first valve member means to cover said first opening, said braking pressure being applied to said first end of said first valve member means in a direction opposing said predetermined force, said predetermined force being larger than said braking pressure to prevent said braking pressure from sliding said first valve member means in said direction opposing said predetermined force; and
        means for receiving a portion of said first valve member means to enable said first valve member means to slide in said direction opposing said predetermined force when said reflux pressure of said operating liquid received in said first chamber increases to a predetermined amount, said first valve member means uncovering said first opening and increasing said volume of said liquid receiving portion when said first valve member means slides in said direction opposing said predetermined force.

2. An anti-lock braking apparatus as in claim 1, wherein said regulating means comprises:
    a second chamber for receiving said operating liquid directed to said regulating means by said first portion of said main flow passage means, said second chamber having a first opening for communicating said second chamber with said first portion of said main flow passage means, a second opening for communicating said second chamber with said second portion of said main flow passage means and a third opening for communicating said second chamber with said second section of said reflux passage means; and second valve member means, slidably disposed in said second chamber of said regulating means, for, in accordance with said braking pressure, communicating one of said first opening of said second chamber with said second opening of said second chamber and said second opening of said second chamber with said third opening of said second chamber.

3. An anti-lock braking apparatus as in claim 1, wherein said second section of said reflux passage means further comprises:

reflux valve means for one of preventing said operating liquid from flowing through said reflux passage means and permitting said operating liquid to flow through said reflux passage means;

means for temporarily storing a portion of said operating liquid being refluxed through said reflux passage means; and flow restricting means for preventing said operating liquid being refluxed through said reflux passage means from flowing through said reflux passage means from said pressure absorbing means to said regulating means.

4. An anti-lock braking apparatus as in claim 3, wherein said flow restricting means comprises first preventing means for preventing said operating liquid being refluxed through said reflux passage means from flowing through said reflux passage means from said pressure absorbing means to said pumping means and second preventing means for preventing said operating liquid being refluxed through said reflux passage means from flowing through said reflux passage means from said pumping means to said regulating means.

5. An anti-lock braking apparatus as in claim 1, wherein said first end of said first valve member means comprises a conical shaped end for covering said first opening of said first chamber.

6. An anti-lock braking apparatus as in claim 1, wherein said applying means comprises a spring.

7. An anti-lock braking apparatus as in claim 1, wherein said first valve member means comprises a flange, said operating liquid received in said first chamber cooperating with said flange to cause said first valve member means to slide in said direction opposing said predetermined force.

* * * * *